(12) United States Patent
Maruyama et al.

(10) Patent No.: US 11,342,817 B2
(45) Date of Patent: May 24, 2022

(54) TOUCH SENSOR UNIT (71) Applicant: MITSUBA Corporation, Gunma (JP)

(72) Inventors: Tsuyoshi Maruyama, Gunma (JP); Yasuhiro Orihara, Gunma (JP); Yohei Inagaki, Gunma (JP)

(73) Assignee: MITSUBA Corporation, Gunma (JP)

( * ) Notice: Subject to any disclaimer, the term of this patent is extended or adjusted under 35 U.S.C. 154(b) by 300 days.

(21) Appl. No.: 16/817,634

(22) Filed: Mar. 13, 2020

(65) Prior Publication Data
US 2021/0021178 A1 Jan. 21, 2021

(30) Foreign Application Priority Data

Jul. 17, 2019 (JP) .............................. JP2019-131723

(51) Int. Cl.
*H02K 15/00* (2006.01)
*H02K 11/28* (2016.01)
*B60R 13/08* (2006.01)
*B60R 16/03* (2006.01)
*B60R 16/00* (2006.01)

(52) U.S. Cl.
CPC .............. *H02K 11/28* (2016.01); *B60R 13/08* (2013.01); *B60R 16/005* (2013.01); *B60R 16/03* (2013.01)

(58) Field of Classification Search
CPC ....... B60R 13/08; B60R 16/005; B60R 16/03; E05F 15/44; E05Y 2900/546; H02K 11/28
See application file for complete search history.

(56) References Cited

U.S. PATENT DOCUMENTS

| 2018/0274269 A1* | 9/2018 | Orihara | .................. E05B 81/78 |
| 2019/0149151 A1* | 5/2019 | Okada | ..................... E05F 15/44 200/211 |
| 2021/0010827 A1* | 1/2021 | Maruyama | .............. B60R 11/00 |

FOREIGN PATENT DOCUMENTS

JP          2017204361          11/2017

* cited by examiner

*Primary Examiner* — Naishadh N Desai
(74) *Attorney, Agent, or Firm* — JCIPRNET (57) ABSTRACT

The disclosure provides a manufacturing method of a touch sensor unit that includes a tubular insulator housing a plurality of electrodes, and the plurality of electrodes housed in the tubular insulator are prevented from being fixed in a short-circuited state by the resin flowing into the tubular insulator. The manufacturing method of the touch sensor unit includes: a first process of disposing an end of a sensor holder, a resistor, connection wires, and a separator, which are included in a mold part provided at an end of the touch sensor unit, in a mold; and a second process of supplying molten resin into the mold in a state where the tubular insulator housing linear electrodes is pressed from an outer side of the sensor holder in the mold. In the second process, the tubular insulator is pressed within a range where the tubular insulator and an insertion protrusion overlap.

2 Claims, 14 Drawing Sheets

TOUCH SENSOR UNIT

CROSS REFERENCE TO RELATED APPLICATIONS

This application claims the priority benefit of Japanese Patent Application No. 2019-131723, filed on Jul. 17, 2019. The entirety of the above-mentioned patent application is hereby incorporated by reference herein and made a part of this specification.

BACKGROUND

Technical Field

The disclosure relates to a touch sensor unit used for detecting contact with an obstacle.

Description of Related Art

A vehicle such as an automobile may be provided with an opening/closing body (for example, a sliding door or a tailgate) for opening and closing an opening of the vehicle, and an opening/closing device for driving the opening/closing body. The opening/closing device includes an electric motor which is a drive source, and an operation switch for turning the electric motor on/off. The electric motor included in the opening/closing device operates based on the operation of the operation switch, and drives the opening/closing body to open or close. Among opening/closing devices, there are automatic opening/closing devices for driving the opening/closing body to open or close regardless of whether the operation switch is operated. One of the conventional automatic opening/closing devices includes a touch sensor unit for detecting an obstacle caught between the opening and the opening/closing body, and drives the opening/closing body based on the detection result of the touch sensor unit. For example, when an obstacle is detected by the touch sensor unit, the automatic opening/closing device drives open the opening/closing body which has been driven to close, or stops it there.

An example of the touch sensor unit as described above is described in Patent Document 1 (Japanese Patent Application Laid-Open No. 2017-204361). The touch sensor unit described in Patent Document 1 has a sensor body, and a sensor holder in which the sensor body is embedded. The sensor body includes an insulating tube and two linear electrodes provided in the insulating tube. The two linear electrodes are provided spirally in the insulating tube and intersect each other in a non-contact state.

Each of the linear electrodes includes a core wire and a sheath covering the core wire, and the core wire of each linear electrode is drawn outside the insulating tube from an end of the insulating tube. Furthermore, the core wire of one linear electrode drawn out from the insulating tube is connected to one end of a resistor, and the core wire of the other linear electrode drawn out from the insulating tube is connected to the other end of the resistor. In the following description, a part of the core wire of the linear electrode drawn out from the end of the insulating tube may be referred to as a "connection wire" to be distinguished from other parts of the core wire. However, such distinction is merely for convenience of explanation.

An end of the touch sensor unit described in Patent Document 1 is provided with a mold part that includes at least an end of the sensor holder, the connection wires, and the resistor therein. The mold part is a resin molded body molded by injecting molten resin into a mold with the end of the sensor holder, the connection wires, the resistor, etc. disposed therein.

The mold part described in Patent Document 1 is provided for waterproofing and protecting the end of the touch sensor unit, and sufficiently achieves such purposes. However, when the mold part is molded, molten resin may flow into the insulating tube from the end of the insulating tube where the connection wires are drawn out. Furthermore, the molten resin flowing into the insulating tube may be cured while the linear electrodes are in contact with each other (short circuit).

The disclosure provides a manufacturing method of a touch sensor unit that includes a tubular insulator housing a plurality of electrodes. The manufacturing method prevents the plurality of electrodes housed in the tubular insulator from being fixed in a short-circuited state by the resin flowing into the tubular insulator.

SUMMARY

The disclosure provides a manufacturing method of a touch sensor unit, which includes: a sensor body in which a plurality of electrodes are housed inside a tubular insulator that is elastically deformed when an external force is applied, and the plurality of electrodes come into contact with each other as the tubular insulator is elastically deformed; a sensor holder in which the sensor body is embedded; an electrical component disposed outside the sensor holder; a connection wire protruding from an end of the tubular insulator and connected to the electrical component; an insulating member including an insertion protrusion inserted into the tubular insulator from the end of the tubular insulator and interposed between the plurality of electrodes; and a mold part including an end of the sensor holder, the electrical component, the connection wire, and the insulating member. The manufacturing method of the touch sensor unit includes: a first process of disposing the end of the sensor holder, the electrical component, the connection wire, and the insulating member included in the mold part in a mold; and a second process of supplying molten resin into the mold in a state where the tubular insulator is pressed from an outer side of the sensor holder in the mold. Moreover, in the second process, the tubular insulator is pressed within a range where the tubular insulator and the insertion protrusion overlap.

DESCRIPTION OF THE EMBODIMENTS

Hereinafter, an example of a manufacturing method of a touch sensor unit of the disclosure (may be referred to as "the manufacturing method" hereinafter) will be described in detail with reference to the drawings. In order to facilitate understanding of the manufacturing method, the manufacturing method will be described after the structure and usage examples of the touch sensor unit manufactured by the manufacturing method are described.

Figure 1:
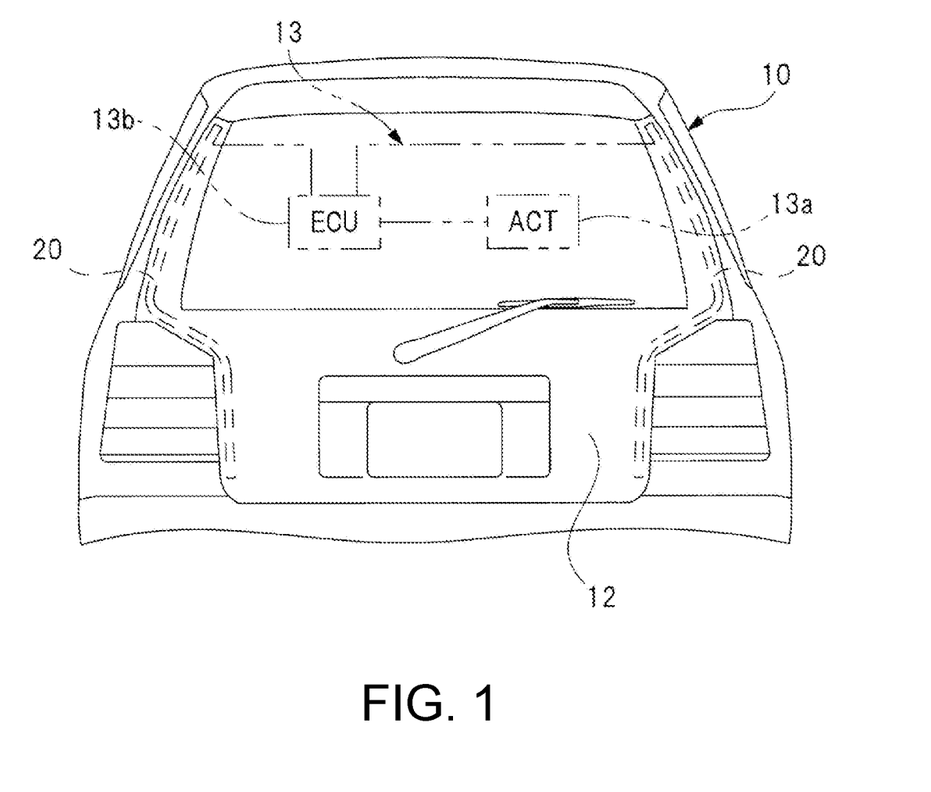
FIG. 1 is a front view showing a tailgate of a vehicle on which a touch sensor unit is mounted.
Figure 2:
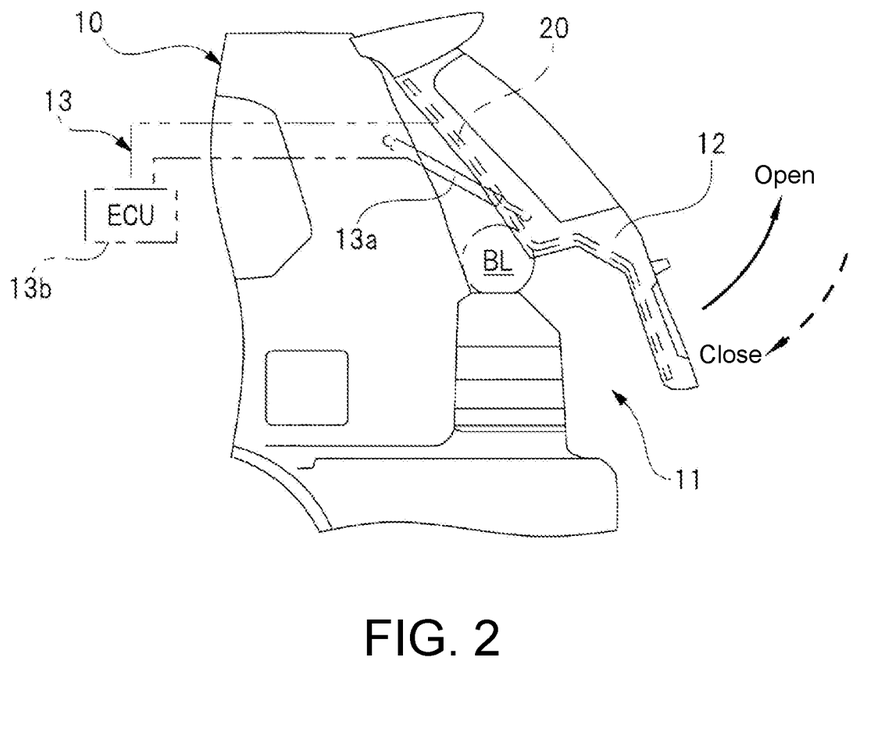
FIG. 2 is a side view showing the tailgate of the vehicle on which the touch sensor unit is mounted.

The touch sensor unit manufactured by the manufacturing method is mounted on a vehicle 10 as shown in FIG. 1 and FIG. 2, for example. The vehicle 10 as shown is a so-called hatchback vehicle, and the rear portion of the vehicle 10 is provided with an opening (rear opening 11) through which large luggage can be taken in and out of the vehicle interior. The rear opening 11 is opened or closed by an opening/closing body 12 that is rotatably supported by a hinge (not shown) provided on the rear side of the vehicle 10. The opening/closing body 12 is called a "tailgate", a "rear gate", a "bag door", or the like, but is referred to as "tailgate" in this specification.

The vehicle 10 is equipped with a power tailgate device 13 that rotates (opens or closes) the tailgate 12 in the directions indicated by the solid and broken arrows in FIG. 2. The power tailgate device 13 includes an actuator 13a with a speed reducer that opens or closes the tailgate 12, a controller 13b controlling the actuator 13a based on an operation of a switch (not shown), and a pair of touch sensor units 20 for detecting an obstacle BL. That is, the touch sensor unit 20 manufactured by the manufacturing method is one of the components of the power tailgate device 13 mounted on the vehicle 10.

The touch sensor units 20 shown in FIG. 1 are provided on the outer peripheral surface of the tailgate 12. Specifically, the touch sensor units 20 are respectively provided on two side surfaces of the tailgate 12 in the vehicle width direction. More specifically, the touch sensor units 20 are provided on two curved side surfaces (edges) of the tailgate 12 along the shapes of the side surfaces. Thus, when the obstacle BL is caught between the rear opening 11 and the tailgate 12, the obstacle BL is detected by the touch sensor unit 20. The touch sensor unit 20 outputs a detection signal when detecting the obstacle BL. The detection signal output from the touch sensor unit 20 is input to the controller 13b. The controller 13b to which the detection signal is input drives open the tailgate 12 that is being driven to close, or stops the tailgate 12 that is being driven to close there regardless of the operation state of the operation switch.

Figure 3:
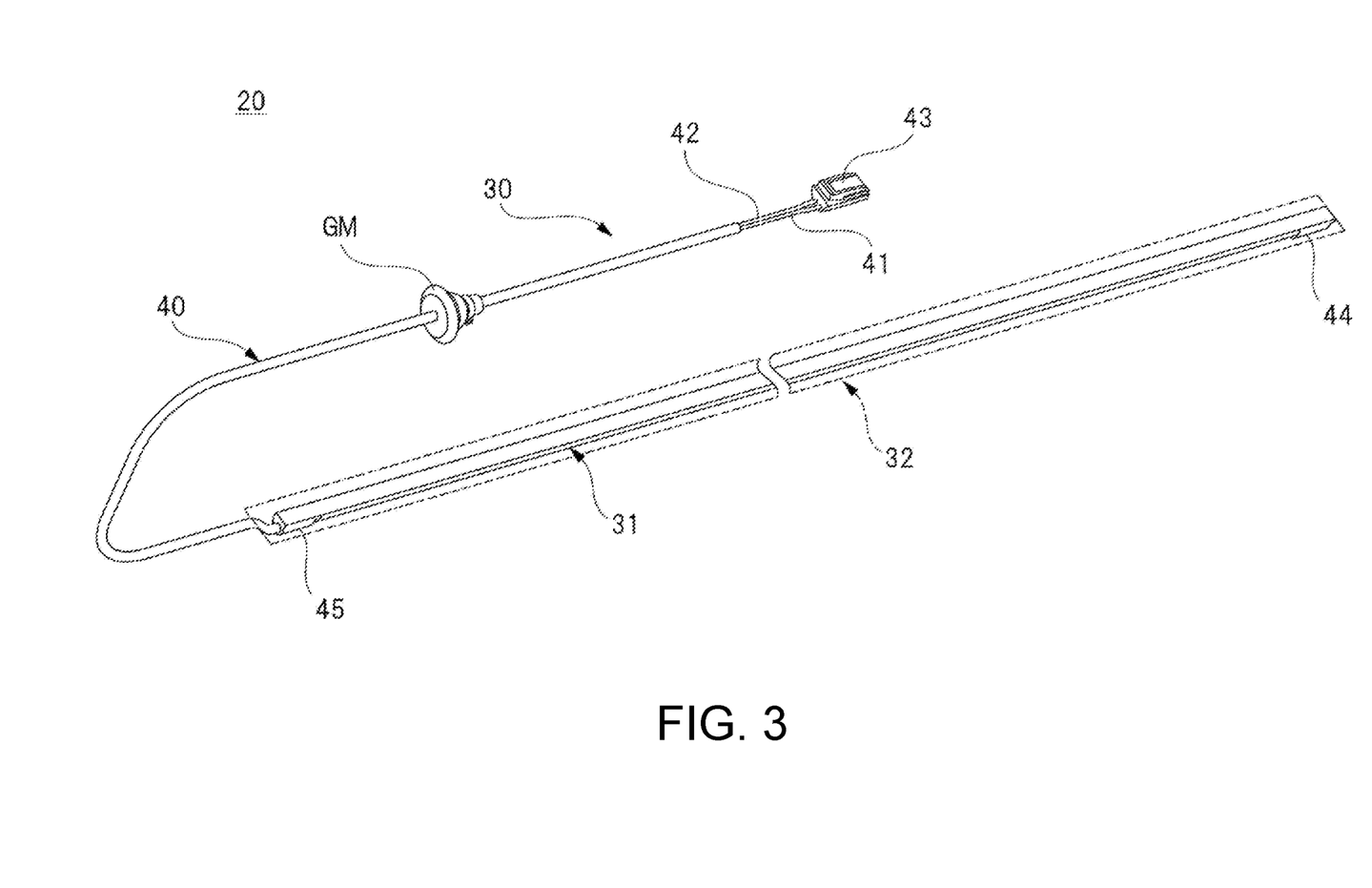
FIG. 3 is a perspective view showing a configuration of the touch sensor unit.

As shown in FIG. 3, the touch sensor unit 20 includes a sensor body 30, a sensor holder 31, and a bracket 32. The sensor body 30, the sensor holder 31, and the bracket 32 are integrated.

The bracket 32 shown in FIG. 3 is formed of a resin material such as plastic, and has substantially the same length as the side surface (edge) of the tailgate 12 (FIG. 1 and FIG. 2) and presents a plate-shaped appearance as a whole. As shown in FIG. 3, a part of the sensor body 30 in the longitudinal direction is fixed to the sensor holder 31 while the remaining part is not fixed to the sensor holder 31. Then, the sensor holder 31 to which a part of the sensor body 30 is fixed is fixed (joined) to the bracket 32. In the following description, a part of the sensor body 30 in the longitudinal direction, which is not fixed to the sensor holder 31, may be referred to as a "lead-out part" to be distinguished from other parts. However, such distinction is merely for convenience of explanation.

The touch sensor unit 20 having the basic structure as described above is attached to the vehicle 10 by fixing (joining) the bracket 32 to the edge of the tailgate 12 (FIG. 1 and FIG. 2). At this time, the lead-out part of the sensor body 30 is drawn to the inner side of the tailgate 12 from a lead-in hole provided in the tailgate 12. Further, the lead-in hole with the lead-out part drawn thereinto is closed by a grommet GM attached to the lead-out part.

As shown in FIG. 3, the sensor body 30 constituting the touch sensor unit 20 has a tubular insulator 40, a plurality of electrodes 41 and 42 which are provided inside the tubular insulator 40 and come into contact with each other as the tubular insulator 40 is elastically deformed, and a connector 43. A part of the tubular insulator 40 in the longitudinal direction, in which the electrodes 41 and 42 are housed, is embedded in the sensor holder 31. The sensor holder 31 is formed of insulating rubber and has elasticity. That is, the sensor holder 31 is elastically deformed when an external force is applied, and returns to the original shape when the external force is removed. In addition, the connector 43 is connected to another connector (not shown). By connecting the connector 43 to another connector, the touch sensor unit 20 is electrically connected to the controller 13b (FIG. 1 and FIG. 2), allowing the detection signal output from the touch sensor unit 20 to be input to the controller 13b.

Figure 4:
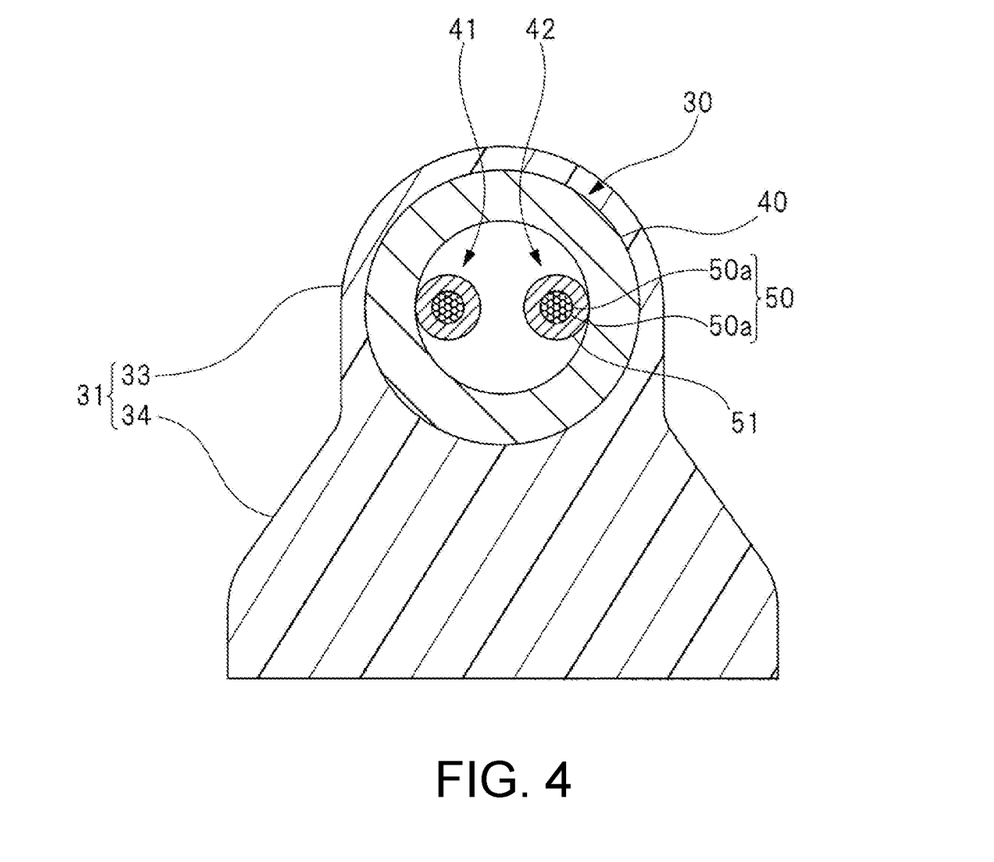
FIG. 4 is an enlarged cross-sectional view showing a structure of a sensor body and a sensor holder.

As shown in FIG. 4, the sensor holder 31 has a housing part 33 and a base part 34 that are integrally formed. The housing part 33 is hollow, and the sensor body 30 is embedded in the housing part 33 and the base part 34 is joined to the bracket 32 (FIG. 3). The tubular insulator 40 shown in FIG. 4 is a tube composed of insulating rubber and has elasticity. That is, the tubular insulator 40 is elastically deformed when an external force is applied, and returns to the original shape when the external force is removed. Further, the inner diameter of the tubular insulator 40 is about three times the outer diameter of the electrodes 41 and 42.

Figure 5:
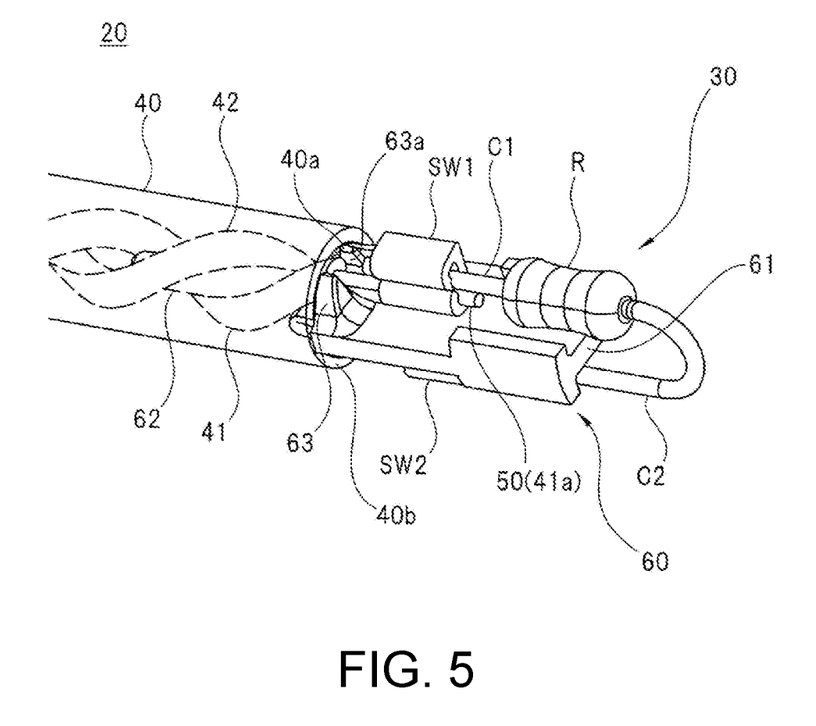
FIG. 5 is an explanatory view showing the structure of the sensor body.

As shown in FIG. 5, the electrodes 41 and 42 housed in the tubular insulator 40 are linear electrodes. The two linear electrodes 41 and 42 are provided spirally inside the tubular insulator 40, and usually, repeatedly intersect each other in a non-contact state. As shown in FIG. 4, the outer peripheral surface of each of the linear electrodes 41 and 42 is fixed (welded) to the inner peripheral surface of the tubular insulator 40, and there is a gap between the two linear electrodes 41 and 42 which is set so that another similar linear electrode may fit in.

As shown in FIG. 4, each of the linear electrodes 41 and 42 includes a core wire 50 composed of a plurality of strands 50a twisted together, and a covering layer (sheath 51) covering the core wire 50. The strand 50a in the present embodiment is a copper wire. That is, the core wire 50 in the present embodiment is a stranded wire composed of a plurality of copper wires. Further, the sheath 51 in the present embodiment is formed of a conductive resin extruded around the core wire 50.

As described above, the tubular insulator 40 that houses the linear electrodes 41 and 42 has elasticity, and the housing part 33 of the sensor holder 31 that houses the sensor body 30 including the tubular insulator 40 also has elasticity. Therefore, when the housing part 33 of the sensor holder 31 receives an external force of a certain level or more and is elastically deformed (collapsed), the external force is applied to the tubular insulator 40 accordingly. Then, the tubular insulator 40 is elastically deformed (collapsed), and the two linear electrodes 41 and 42 come close to each other and come into contact with each other in the tubular insulator 40. Specifically, the sheath 51 of one linear electrode 41 and the sheath 51 of the other linear electrode 42 come into contact with each other. As a result, the two linear electrodes 41 and 42 are electrically connected (short-circuited).

Figure 6:
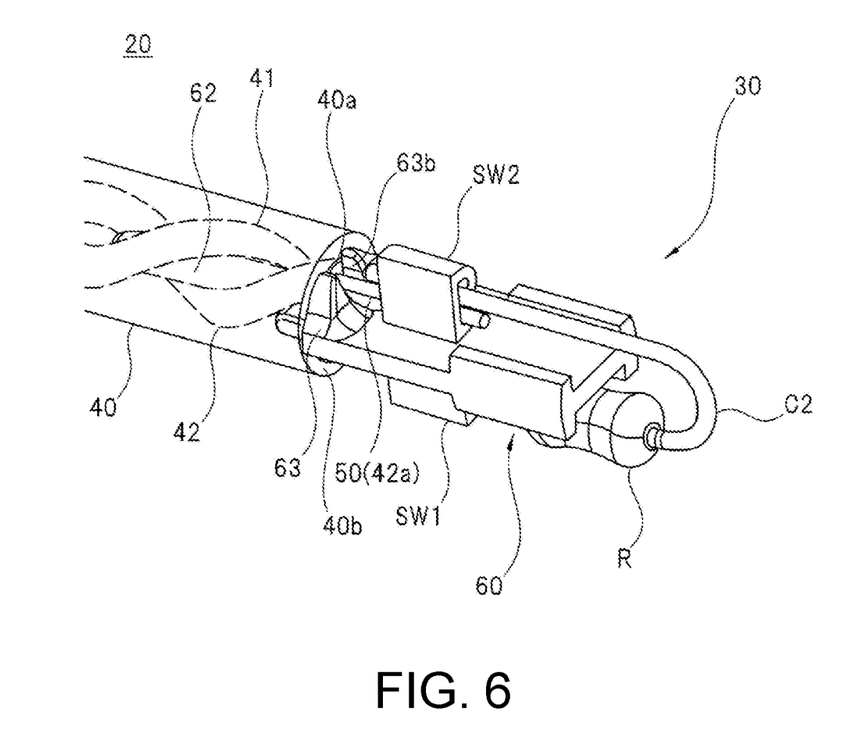
FIG. 6 is another explanatory view showing the structure of the sensor body.

As shown in FIG. 5 and FIG. 6, the core wires 50 of the linear electrodes 41 and 42 are drawn out from one end 40a of the tubular insulator 40. Each of the two core wires 50 drawn out from the end 40a of the tubular insulator 40 is a part of the core wire 50 exposed to the outside by partially removing the sheath 51 (FIG. 4) of the linear electrodes 41 and 42, and corresponds to the connection wire in the disclosure. Thus, in the following description, the exposed portion of the core wire 50 in the linear electrode 41 is referred to as a "connection wire 41a", and the exposed portion of the core wire 50 in the linear electrode 42 is referred to as a "connection wire 42a".

As shown in FIG. 5 and FIG. 6, the touch sensor unit 20 further has a resistor R as an electrical component disposed outside the sensor holder 31. One end of the resistor R is provided with a short connection part C1, and the other end of the resistor R is provided with a long connection part C2. The long connection part C2 is folded 180 degrees and is arranged in parallel to the short connection part C1. As shown in FIG. 5, the connection wire 41a of the linear electrode 41 and the short connection part C1 are connected to each other by a connection member SW1. As shown in FIG. 6, the connection wire 42a of the linear electrode 42 and the long connection part C2 are connected to each other by another connection member SW2.

Figure 7:
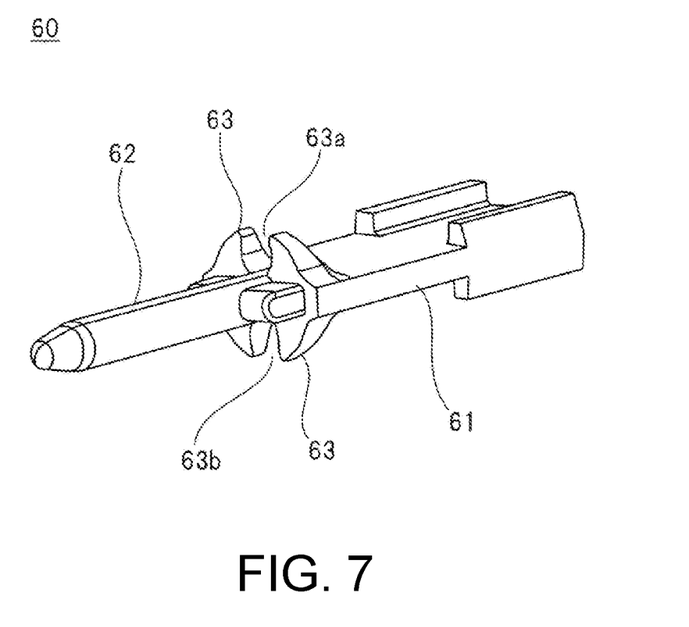
FIG. 7 is a perspective view showing a separator.

As shown in FIG. 5 and FIG. 6, the touch sensor unit 20 further has a separator 60 as an insulating member. As shown in FIG. 7, the separator 60 has a substantially flat plate-shaped separator body 61, and a substantially columnar insertion protrusion 62 that protrudes from one end of the separator body 61 in the longitudinal direction. However, the separator body 61 and the insertion protrusion 62 are integrally formed of an insulating material such as plastic.

Figure 8:
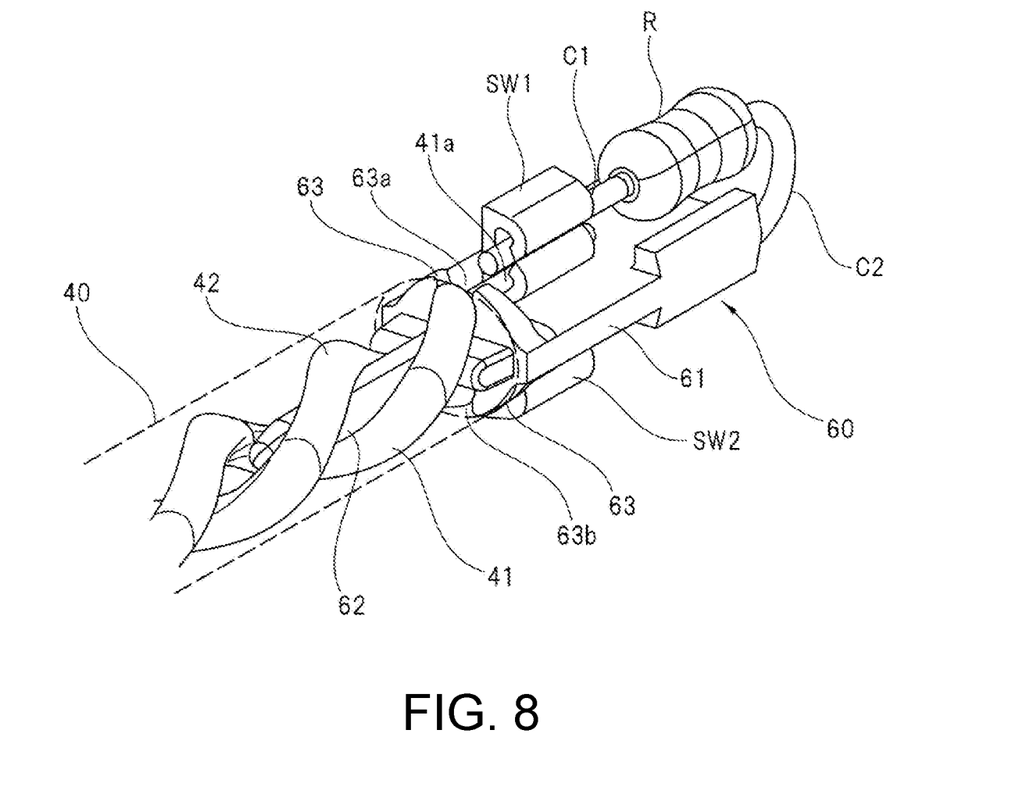
FIG. 8 is an explanatory view showing a positional relationship between the linear electrodes in a tubular insulator and an insertion protrusion of the separator.

As shown in FIG. 5, FIG. 6, and FIG. 8, the insertion protrusion 62 of the separator 60 is inserted into the tubular insulator 40 from the end 40a of the tubular insulator 40. In the following description, the end 40a of the tubular insulator 40, which is the outlet of the connection wires 41a and 42a and the insertion port of the insertion protrusion 62, is referred to as the "opening end 40a". The insertion protrusion 62 inserted into the tubular insulator 40 from the opening end 40a is interposed between the two linear electrodes 41 and 42 inside the tubular insulator 40 and prevents contact (short circuit) between the linear electrodes 41 and 42. Further, the separator body 61 of the separator 60 is interposed between the two connection wires 41a and 42a outside the opening end 40a and prevents contact (short circuit) between the connection wires 41a and 42a. Specifically, the resistor R, the short connection part C1, the connection wire 41a, and the connection member SW1 are disposed on one side of the separator body 61 (FIG. 5), and the long connection part C2, the connection wire 42a, and the connection member SW2 are disposed on the other side of the separator body 61 (FIG. 6).

As shown in FIG. 7, two closing parts 63 are formed at the tip of the separator body 61 so as to surround the root of the insertion protrusion 62. In the center of the closing part 63 formed on one side of the separator body 61, a concave part 63a is provided for avoiding the connection wire 41a (FIG. 5). In the center of the closing part 63 formed on the other side of the separator body 61, a concave part 63b is formed for avoiding the connection wire 42a (FIG. 6). The two concave parts 63a and 63b are provided at positions different by 180 degrees in the circumferential direction of the insertion protrusion 62.

As shown in FIG. 5, the connection wire 41a is drawn out on the separator body 61 through the inner side of the concave part 63a and is connected to the short connection part C1. In addition, as shown in FIG. 6, the connection wire 42a is drawn out on the separator body 61 through the inner side of the concave part 63b and is connected to the long connection part C2. Moreover, as shown in FIG. 5 and FIG. 6, the front surfaces of the two closing parts 63 abut against the end surface (peripheral edge of the opening end 40a) of the tubular insulator 40. In other words, the insertion protrusion 62 is inserted into the tubular insulator 40 until the front surfaces of the two closing parts 63 abut against the end surface of the tubular insulator 40. As a result, the substantially entire area of the opening end 40a of the tubular insulator 40 is closed by the closing parts 63.

In the following description, the connection wires 41a and 42a, the resistor R, the connection members SW1 and SW2, and the separator body 61 may be collectively referred to as an "electrical connection part".

Figure 9:
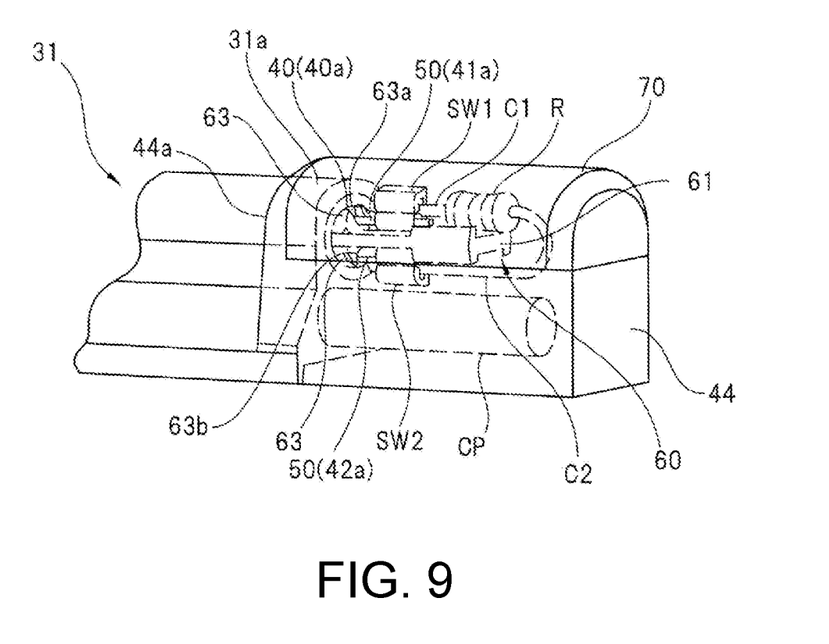
FIG. 9 is a perspective view showing a mold part and a cover member.
Figure 10:
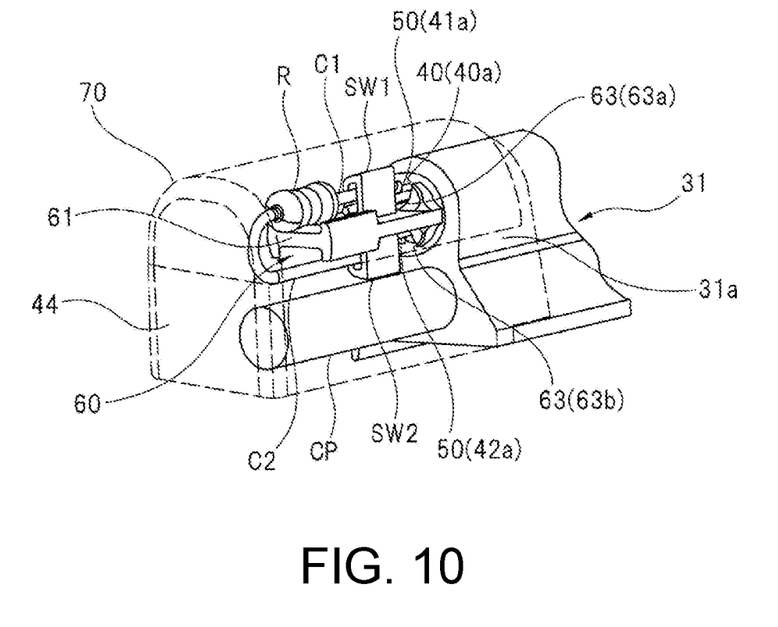
FIG. 10 is another perspective view showing the mold part and the cover member.

Referring to FIG. 3 again, a mold part 44 is provided on one end side of the touch sensor unit 20 in the longitudinal direction. The mold part 44 is, as shown in FIG. 9 and FIG. 10, a resin molded body including the end 31a of the sensor holder 31 and the electrical connection part provided outside the sensor holder 31. That is, the end 31a of the sensor holder 31 and the electrical connection part are molded together with resin.

As shown in FIG. 9 and FIG. 10, the mold part 44 is covered with a cover member 70 that covers at least a part of the components of the electrical connection part via the mold part 44. In other words, the cover member 70 is provided around the mold part 44 including the electrical connection part therein, and covers a part of the surface of the mold part 44.

The mold part 44 shown in FIG. 9 and FIG. 10 is a resin molded body made by injection molding using a mold. The manufacturing method includes a mold part molding process of molding the mold part 44 shown in FIG. 9 and FIG. 10. Furthermore, the mold part molding process includes a process of assembling necessary components ("assembly process"), a process of disposing the assembled components in the mold (setting process), and a process of supplying molten resin into the mold where the components are disposed (injection process).

Figure 11:
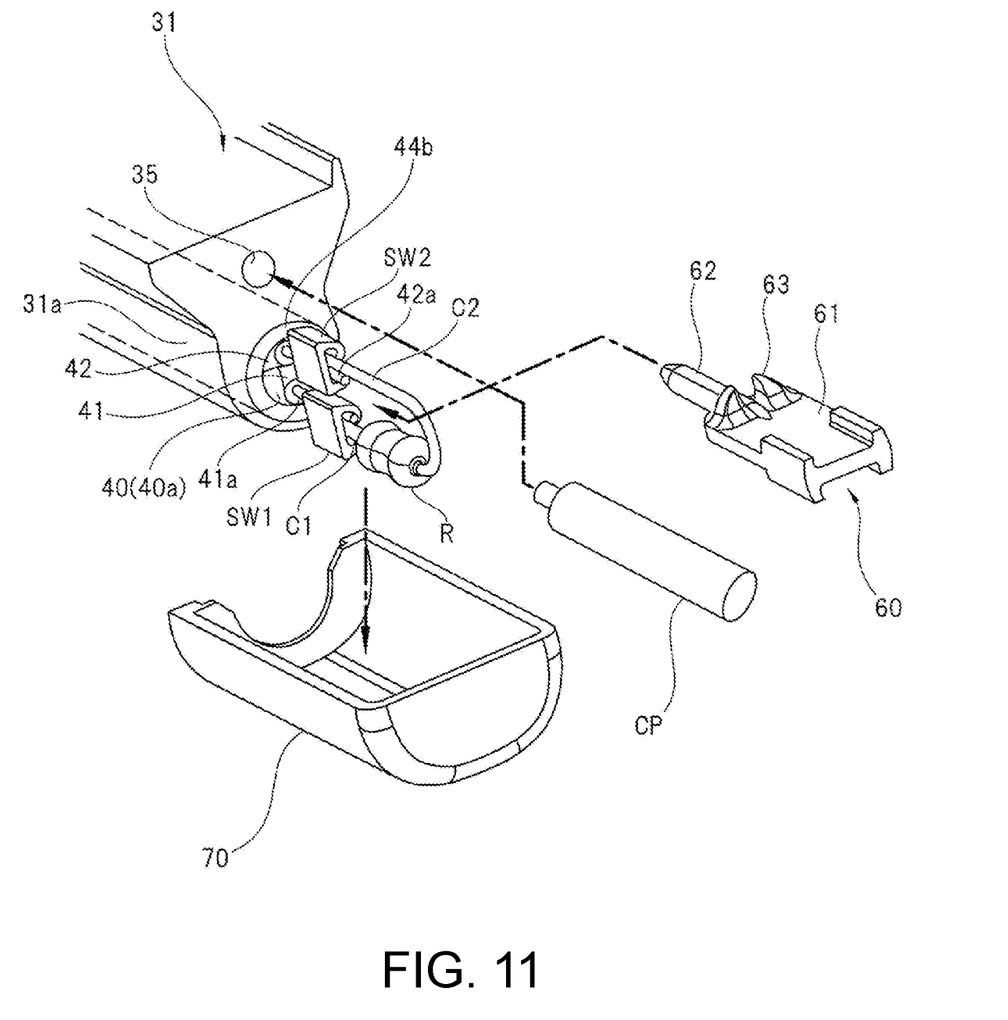
FIG. 11 is an explanatory view showing a manufacturing process of the touch sensor unit.

In the assembly process, as shown in FIG. 11, the separator 60 is assembled at a predetermined position in a predetermined direction. Specifically, the separator 60 is inserted between the body of the resistor R and the long connection part C2 so that the resistor R, the short connection part C1, the connection wire 41a, and the connection member SW1 are arranged on one side of the separator body 61, and the long connection part C2, the connection wire 42a, and the connection member SW2 are arranged on the other side of the separator body 61. Thereafter, the insertion protrusion 62 of the separator 60 is inserted between the two linear electrodes 41 and 42 in the tubular insulator 40 from the opening end 40a of the tubular insulator 40. At this time, the insertion protrusion 62 is inserted into the tubular insulator 40 until the front surfaces of the closing parts 63 of the separator 60 abut against the end surface of the tubular insulator 40. As a result, the insertion protrusion 62 of the separator 60 is interposed between the two linear electrodes 41 and 42 in the tubular insulator 40, and prevents contact (short circuit) between the linear electrodes 41 and 42. However, contact (short circuit) between the linear electrodes 41 and 42 is prevented only in a range where the linear electrodes 41 and 42 and the insertion protrusion 62 overlap.

At the same time, the separator body 61 of the separator 60 is interposed between the short connection part C1, the connection wire 41a, and the connection member SW1 and the long connection part C2, the connection wire 42a, and the connection member SW2, and prevents contact (short circuit) between these components. Further, the opening end 40a of the tubular insulator 40 is closed by the closing parts 63 with substantially no gap.

In addition, the tip of the insertion protrusion 62 is formed to be tapered to facilitate insertion between the linear electrodes 41 and 42. In addition, the diameter of the insertion protrusion 62 is slightly larger than the diameter of the linear electrodes 41 and 42, and enters the gap between the linear electrodes 41 and 42 while slightly pushing away the linear electrodes 41 and 42. Thus, the insertion protrusion 62 inserted between the two linear electrodes 41 and 42 does not come out accidentally.

As shown in FIG. 11, an insertion hole 35 is formed in the sensor holder 31 over substantially the entire length thereof, and a core metal (not shown) is inserted into the insertion hole 35. Therefore, a cap CP that closes the insertion hole 35 is attached to the sensor holder 31 in the assembly process. Specifically, a protrusion protruding from one end surface of the cap CP is press-fitted into the insertion hole 35. Thereby, the molten resin is prevented from flowing into the insertion hole 35 in the subsequent injection process.

Figure 12:
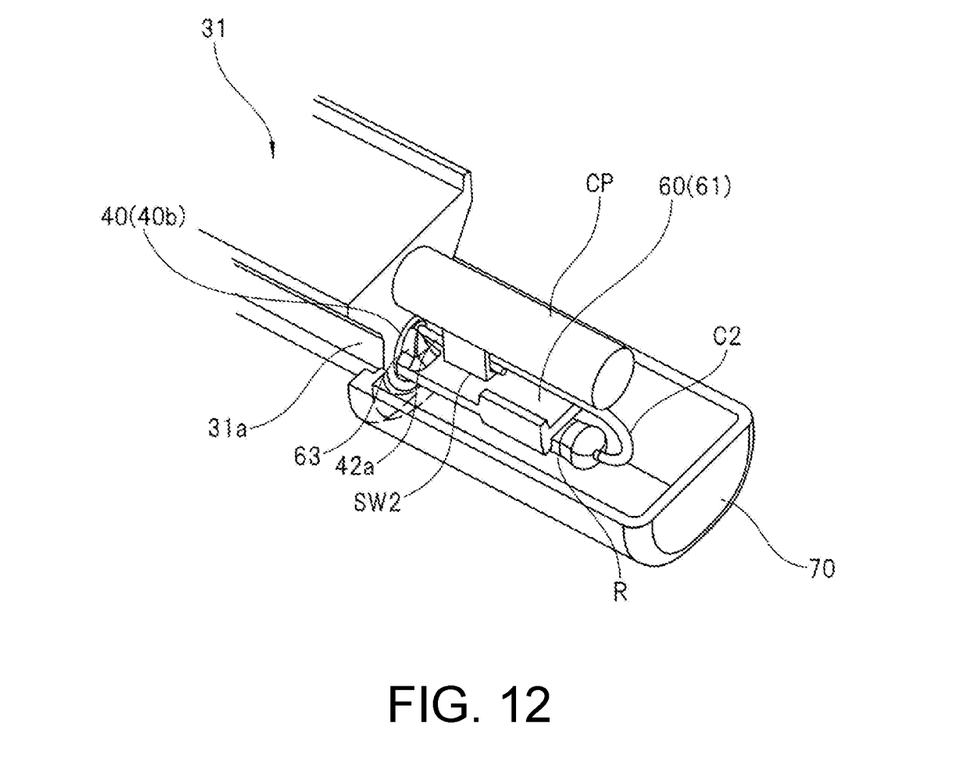
FIG. 12 is another explanatory view showing the manufacturing process of the touch sensor unit.

In the setting process, as shown in FIG. 11 and FIG. 12, the cover member 70 is disposed in the mold (not shown), and the end 31a of the sensor holder 31 and the electrical connection part are disposed on the inner side of the cover member 70. As already described, the end 31a of the sensor holder 31 and the electrical connection part including the connection wires 41a and 42a, the resistor R, the connection members SW1 and SW2, and the separator body 61 are included in the mold part 44 at the end. That is, the setting process is a process of disposing the end 31a of the sensor holder 31, the electrical component (resistor R), the connection wires (connection wires 41a and 42a), and the insulating member (separator 60) to be included in the mold part 44 in the mold, and corresponds to the first process of the disclosure.

Figure 13:
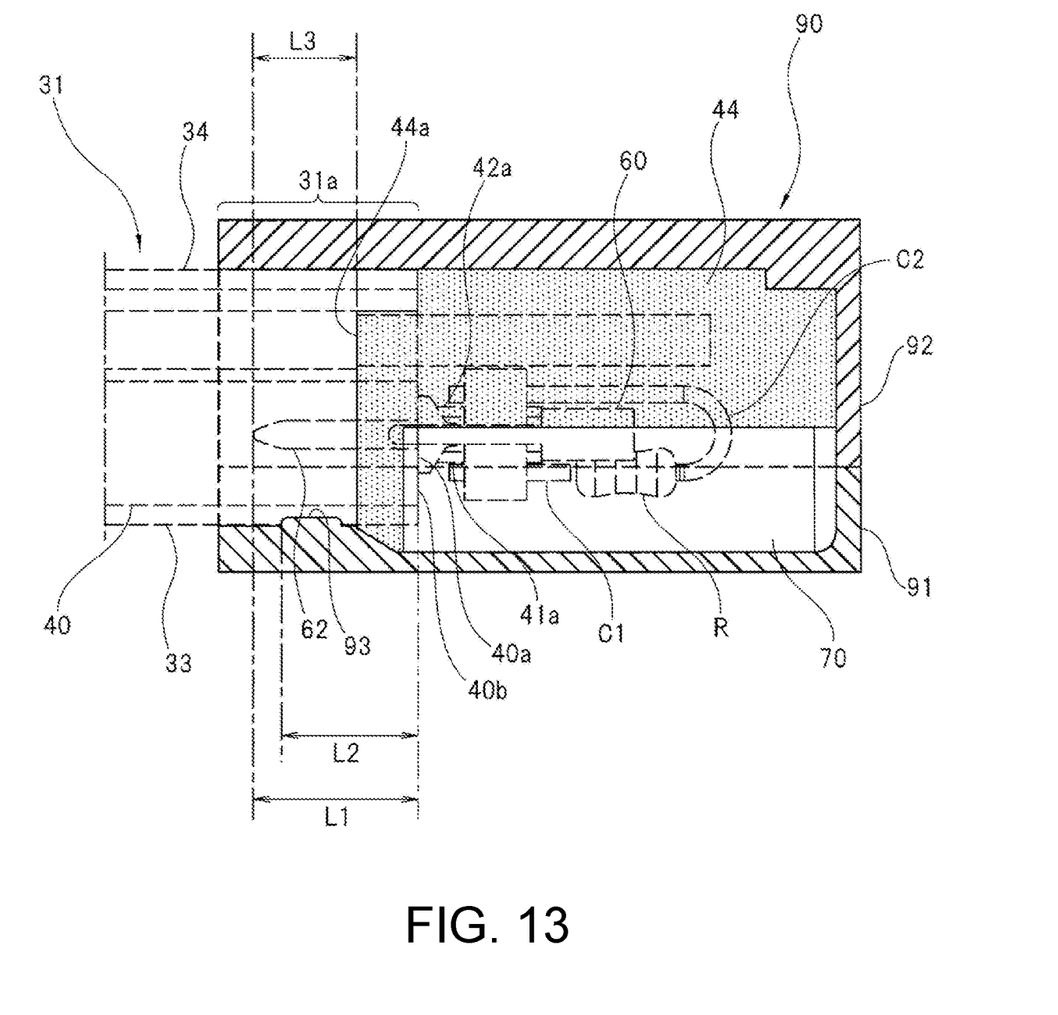
FIG. 13 is an explanatory view showing a pressing point for the tubular insulator.
Figure 14:
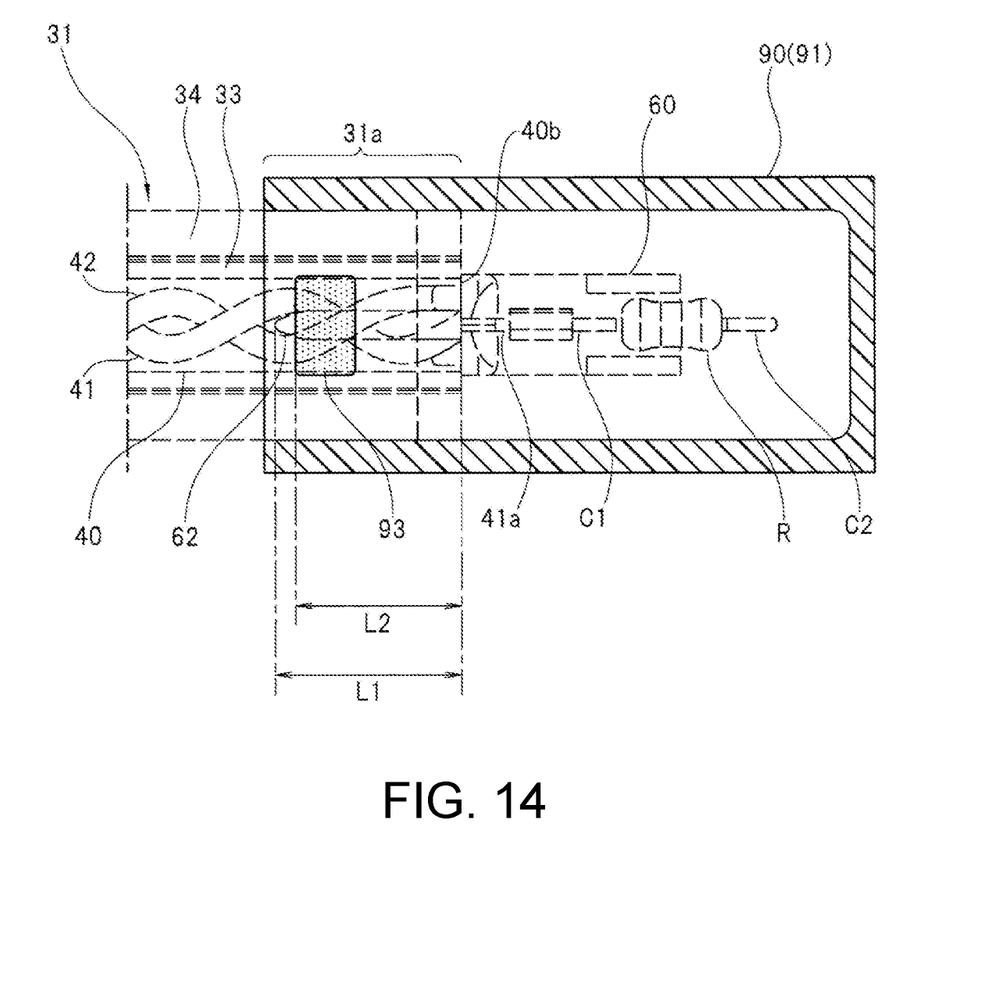
FIG. 14 is another explanatory view showing the pressing point for the tubular insulator.

In the injection process, as shown in FIG. 13 and FIG. 14, molten resin is supplied into the mold 90 in which the end 31a of the sensor holder 31, the electrical connection part, and the cover member 70 are disposed. The mold 90 includes a lower mold 91 and an upper mold 92 that are butted against each other. In addition, in the setting process, the cover member 70 is disposed in the lower mold 91. Further, the end 31a of the sensor holder 31 and the electrical connection part are set in the mold 90 so that all or most of the housing part 33 of the sensor holder 31 is disposed in the lower mold 91 and all or most of the base part 34 of the sensor holder 31 is disposed in the upper mold 92.

As shown in FIG. 13 and FIG. 14, a convex part 93 is provided on the inner side of the lower mold 91 so as to abut against the outer surface of the sensor holder 31 disposed in the lower mold 91, more specifically, the outer surface of the housing part 33. The convex part 93 is substantially rectangular, and the long side thereof is substantially the same as the outer diameter of the tubular insulator 40. Thus, when the upper mold 92 is put on and clamped with the lower mold 91 which houses the end 31a of the sensor holder 31, the electrical connection part, and the cover member 70, the convex part 93 is pressed against the outer surface of the sensor holder 31, more specifically, the outer surface of the housing part 33, and the tubular insulator 40 is pressed from the outer side of the sensor holder 31.

In the injection process, molten resin is supplied into the mold 90 with the tubular insulator 40 being pressed from the outer side of the sensor holder 31 as described above. That is, the injection process corresponds to the second process of the disclosure.

As shown in FIG. 13 and FIG. 14, the convex part 93 of the lower mold 91 is located between the end surface 40b of the tubular insulator 40 and the tip of the insertion protrusion 62 in the longitudinal direction of the tubular insulator 40 and the insertion protrusion 62. That is, the convex part 93 of the lower mold 91 is provided in a range where the tubular insulator 40 and the insertion protrusion 62 overlap, and the tubular insulator 40 is pressed from the outer side of the sensor holder 31 in the same range.

In other words, the distance L1 from the end surface 40b of the tubular insulator 40 to the tip of the insertion protrusion 62 is longer than the distance L2 from the end surface 40b of the tubular insulator 40 to the convex part 93 (L1>L2). As clearly shown in FIG. 13 and FIG. 14, the distance L1 is a linear distance along the central axis of the tubular insulator 40 from the end surface 40b of the tubular insulator 40 to the tip of the insertion protrusion 62 of the separator 60. The distance L2 is a linear distance along the central axis of the tubular insulator 40 from the end surface 40b of the tubular insulator 40 to an end of the convex part 93 of the mold 90. Furthermore, the distance L1 is equal to the total length of the insertion protrusion 62, and is also equal to the insertion length of the insertion protrusion 62 with respect to the tubular insulator 40. The distance L1 is preferably about 6.0 mm.

When another mold part substantially the same as the mold part 44 shown in FIG. 13 is molded, the distance corresponding to the distance L1 shown in FIG. 13 may be the same as described above or may be increased or decreased as appropriate. For example, as shown in FIG. 3, another mold part 45 is molded on the opposite side of the side where the mold part 44 of the sensor holder 31 is provided. When the mold part 45 is molded, the distance corresponding to the distance L1 shown in FIG. 13 is set to about 13.5 mm, for example.

In addition, as shown in FIG. 13, the convex part 93 of the lower mold 91 is located between the end surface 44a of the mold part 44 molded by the injection process and the tip of the insertion protrusion 62. The distance L3 from the end surface 44a of the mold part 44 as shown to the tip of the insertion protrusion 62 is about 3.0 mm. Thus, the convex part 93 is preferably located between the end surface 40b of the tubular insulator 40 and the tip of the insertion protrusion 62, and more preferably located between the end surface 44a of the mold part 44, which is closer to the tip of the insertion protrusion 62 than the end surface 40b of the tubular insulator 40, and the tip of the insertion protrusion 62. The same applies to the molding of the mold part 45 shown in FIG. 3.

As described above, in the injection process corresponding to the second process of the disclosure, molten resin is supplied into the mold 90 with the tubular insulator 40 being pressed from the outer side of the sensor holder 31. Thus, even if a part of the molten resin supplied into the mold 90 flows into the tubular insulator 40 from the opening end 40a of the tubular insulator 40, the molten resin does not enter beyond the pressing point. In other words, the molten resin flowing into the tubular insulator 40 from the opening end 40a of the tubular insulator 40 is blocked by the pressing point.

Furthermore, the pressing point for the tubular insulator 40 is located within a range where the tubular insulator 40 and the insertion protrusion 62 overlap. As already described, the insertion protrusion 62 is interposed between the linear electrodes 41 and 42 inside the tubular insulator 40 and prevents contact between the linear electrodes 41 and 42 (insulate the linear electrodes 41 and 42). That is, the pressing point for the tubular insulator 40 is located within a range where the linear electrodes 41 and 42 are insulated by the insertion protrusion 62. Therefore, even if the molten resin flows into the tubular insulator 40, the linear electrodes 41 and 42 are not short-circuited.

However, the opening end 40a of the tubular insulator 40 is closed by the closing parts 63 of the separator 60 before and after the injection process. Thus, basically, the molten resin does not flow into the tubular insulator 40, and even if it flows into the tubular insulator 40, the amount is small.

The disclosure is not limited to the above embodiment, and various changes can be made without departing from the scope of the disclosure. For example, a pressing member separate from the mold 90 may be disposed in the mold 90, in place of the convex part 93 formed integrally with the mold 90, to press the tubular insulator 40. Other Configurations The disclosure provides a manufacturing method of a touch sensor unit, which includes: a sensor body in which a plurality of electrodes are housed inside a tubular insulator that is elastically deformed when an external force is applied, and the plurality of electrodes come into contact with each other as the tubular insulator is elastically deformed; a sensor holder in which the sensor body is embedded; an electrical component disposed outside the sensor holder; a connection wire protruding from an end of the tubular insulator and connected to the electrical component; an insulating member including an insertion protrusion inserted into the tubular insulator from the end of the tubular insulator and interposed between the plurality of electrodes; and a mold part including an end of the sensor holder, the electrical component, the connection wire, and the insulating member. The manufacturing method of the touch sensor unit includes: a first process of disposing the end of the sensor holder, the electrical component, the connection wire, and the insulating member included in the mold part in a mold; and a second process of supplying molten resin into the mold in a state where the tubular insulator is pressed from an outer side of the sensor holder in the mold. Moreover, in the second process, the tubular insulator is pressed within a range where the tubular insulator and the insertion protrusion overlap.

According to an embodiment of the disclosure, in the second process, a convex part provided on an inner side of the mold is pressed against an outer surface of the sensor holder to press the tubular insulator.

According to the disclosure, it is possible to easily and reliably manufacture a touch sensor unit including a tubular insulator that houses a plurality of electrodes, and the plurality of electrodes housed in the tubular insulator are not fixed in a short-circuited state by the resin flowing into the tubular insulator.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A manufacturing method of a touch sensor unit, which comprises:
    a sensor body in which a plurality of electrodes are housed inside a tubular insulator that is elastically deformed when an external force is applied, and the plurality of electrodes come into contact with each other as the tubular insulator is elastically deformed;
    a sensor holder in which the sensor body is embedded;
    an electrical component disposed outside the sensor holder;
    a connection wire protruding from an end of the tubular insulator and connected to the electrical component;
    an insulating member comprising an insertion protrusion inserted into the tubular insulator from the end of the tubular insulator and interposed between the plurality of electrodes; and
    a mold part including an end of the sensor holder, the electrical component, the connection wire, and the insulating member, and
    the manufacturing method of the touch sensor unit comprising:
    a first process of disposing the end of the sensor holder, the electrical component, the connection wire, and the insulating member included in the mold part in a mold; and
    a second process of supplying molten resin into the mold in a state where the tubular insulator is pressed from an outer side of the sensor holder in the mold,
    wherein in the second process, the tubular insulator is pressed within a range where the tubular insulator and the insertion protrusion overlap.

2. The manufacturing method of the touch sensor unit according to claim 1, wherein in the second process, a convex part provided on an inner side of the mold is pressed against an outer surface of the sensor holder to press the tubular insulator.

* * * * *